United States Patent
Yamada et al.

(10) Patent No.: US 8,212,502 B2
(45) Date of Patent: Jul. 3, 2012

(54) CONTROL APPARATUS AND CONTROL METHOD FOR HYBRID VEHICLE

(75) Inventors: Kenji Yamada, Toyota (JP); Takeshi Itoh, Nagoya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 485 days.

(21) Appl. No.: 12/449,742

(22) PCT Filed: Mar. 3, 2008

(86) PCT No.: PCT/JP2008/054232
§ 371 (c)(1),
(2), (4) Date: Aug. 25, 2009

(87) PCT Pub. No.: WO2008/120533
PCT Pub. Date: Oct. 9, 2008

(65) Prior Publication Data
US 2010/0045220 A1    Feb. 25, 2010

(30) Foreign Application Priority Data
Mar. 29, 2007  (JP) ................................ 2007-088495

(51) Int. Cl.
*H02P 5/46* (2006.01)
*H02P 3/00* (2006.01)
*H02P 5/00* (2006.01)

(52) U.S. Cl. .............. 318/68; 318/139; 318/53; 318/59; 180/65.1; 180/65.225; 180/65.25; 180/65.29

(58) Field of Classification Search .................... 318/68, 318/139, 53, 59; 180/65.1, 65.225, 65.25, 180/65.29
See application file for complete search history.

(56) References Cited

U.S. PATENT DOCUMENTS
6,166,514 A     12/2000 Ando et al.
6,784,563 B2 *   8/2004 Nada ........................... 290/40 C
(Continued)

FOREIGN PATENT DOCUMENTS
JP    A-2001-263120    9/2001
(Continued)

OTHER PUBLICATIONS
Russian Office Action issued in Application No. 2009139928; Dated Jul. 6, 2010 (With Translation).

*Primary Examiner* — Walter Benson
*Assistant Examiner* — Erick Glass
(74) *Attorney, Agent, or Firm* — Oliff & Berridge, PLC (57) ABSTRACT

A first motor generator-control unit (MG1-ECU) and a second motor generator-control unit (MG2-ECU) are provided independently for respective motor generators. The MG2-ECU performs electric power balance control by correcting an MG2 torque command value as required, so that the sum of the MG1 electric power and the MG2 electric power is within a range of allowable input/output electric power of a DC power supply. The electric power balance control is performed using an estimate of the MG1 electric power based on data obtained by the MG1-ECU. The estimate is determined so that a communication delay time between the MG1-ECU and the MG2-ECU is corrected. In this way, the electric power balance control can be performed appropriately for restricting, within a predetermined range, the total input/output electric power of the electric motors as a whole of a hybrid vehicle mounted with a plurality of motor generators (electric motors).

20 Claims, 7 Drawing Sheets

U.S. PATENT DOCUMENTS

| | | |
|---|---|---|
| 7,953,525 B2 * | 5/2011 | Oyobe et al. .............. 701/22 |
| 2009/0091180 A1 * | 4/2009 | Iwasaki et al. ............. 303/11 |

FOREIGN PATENT DOCUMENTS

| JP | A-2001-268712 | 9/2001 |
|---|---|---|
| JP | A-2003-204606 | 7/2003 |
| JP | A-2006-121784 | 5/2006 |
| JP | A-2006-174567 | 6/2006 |
| JP | A-2006-180602 | 7/2006 |
| JP | A-2007-166821 | 6/2007 |
| RU | 2 193 814 C2 | 11/2002 |
| WO | WO 03/015254 A1 | 2/2003 |
| WO | WO 2006/006293 A1 | 1/2006 |

* cited by examiner

CONTROL APPARATUS AND CONTROL METHOD FOR HYBRID VEHICLE

TECHNICAL FIELD

The present invention relates to a control apparatus for a hybrid vehicle, and more particularly to a control apparatus for a hybrid vehicle configured to include a control unit (ECU) provided independently for each electric motor.

BACKGROUND ART

A motor drive control apparatus driving and controlling a plurality of electric motors has been used as one type of the motor drive control apparatus applied to a hybrid vehicle. International Publication No. WO2003/015254 for example discloses in FIG. 9 a configuration of a motor drive control apparatus used for a hybrid vehicle of a two-motor system including electric motors M1 and M2.

FIG. 9 of International Publication No. WO2003/015254 conceptually shows a common control apparatus as the control apparatus for driving and controlling electric motors M1 and M2. As for the actual motor drive control apparatus, however, if a single control apparatus (electronic control unit: ECU for example) is used to perform control operation for both of motors M1 and M2, an excessively heavy processing load is placed on the ECU, and accordingly a high-performance ECU may be required.

Therefore, a practical configuration is the one including control apparatuses (ECU) provided separately and independently for respective electric motors so that each control apparatus (ECU) performs control operation for driving the associated electric motor. This configuration enables a motor drive control apparatus to be implemented without excessive processing load on each control apparatus and without excessive demand for the processing speed of the control apparatus, namely without increasing the cost for each control apparatus (ECU).

In the case, however, where control apparatuses (ECU) are provided separately and independently for respective electric motors, a problem arises when motor M1 and motor M2 are cooperatively controlled. One example of this cooperative control is electric power balance control performed for restricting, within a certain range, the total input/output electric power to/from a plurality of electric motors as a whole.

In order to speedily perform the electric power balance control, it is preferable in terms of readiness to implement a control configuration managing the electric power balance by one of a plurality of separately provided control apparatuses and restricting as required the electric power of the electric motor associated with that control apparatus. The control configuration, however, could lose synchronization between a plurality of electric motors in terms of the data and information used for the electric power balance control, due to an influence of the time for communication between the control apparatus performing the electric power balance control and other control apparatuses. In other words, recognition of data and information is delayed by the time consumed for communication. As a result, particularly in a period in which the electric motor output (rotational speed, torque) varies, the possibility that appropriate electric power balance control is impossible cannot be denied.

DISCLOSURE OF THE INVENTION

The present invention has been made to solve the problem above, and an object of the invention is to appropriately perform, by a control apparatus for a hybrid vehicle configured to include control units (ECU) provided separately for respective electric motors, the electric power balance control to restrict the total electric power of the electric motors within a predetermined range, while eliminating the influence of the time for communication between the control units.

A control apparatus for a hybrid vehicle is provided according to the present invention. The hybrid vehicle is mounted with first and second electric motors and a power storage device configured to be able to supply and receive electric power to and from the first and second electric motors. The control apparatus includes first and second control units for driving and controlling the first and second electric motors respectively, a communication path for communicating data between the first and second control units, an estimation unit, and an electric power balance control unit. The estimation unit estimates an input/output electric power of the first electric motor at the same timing as an input/output electric power of the second electric motor, based on data about the first electric motor that is obtained by the first control unit and by correcting a communication delay time in the communication path when the data is transmitted from the first control unit to the second control unit. The electric power balance control unit restricts, by the second control unit, a sum of the input/output electric power of the first electric motor and the input/output electric power of the second electric motor within a predetermined range, using an input/output electric power estimate of the first electric motor that is determined by the estimation unit.

A control method for a hybrid vehicle is provided according to the present invention. The hybrid vehicle includes the first and second electric motors, the power storage device, the first and second control units, and the communication path as described above. The control method includes the steps of: estimating an input/output electric power of the first electric motor at the same timing as an input/output electric power of the second electric motor, based on data about the first electric motor that is obtained by the first control unit and by correcting a communication delay time in the communication path when the data is transmitted from the first control unit to the second control unit; and restricting, by the second control unit, a sum of the input/output electric power of the first electric motor and the input/output electric power of the second electric motor within a predetermined range, using an input/output electric power estimate of the first electric motor that is determined in the step of estimating.

Preferably, the electric power balance control unit includes a torque restriction unit. The torque restriction unit restricts an output torque of the second electric motor such that a sum of the input/output electric power of the second electric motor that is calculated by the second control unit and the input/output electric power estimate determined by the estimation unit is within the predetermined range. On the other hand, the step of restricting includes the step of restricting an output torque of the second electric motor such that a sum of the input/output electric power of the second electric motor that is calculated by the second control unit and the input/output electric power estimate determined by the estimation unit is within the predetermined range.

In the control apparatus for the hybrid vehicle, one of the first and second control units provided respectively for the first and second electric motors can be used to speedily perform the electric power balance control for managing the total electric power of the electric motors, and highly accurately perform the electric power balance control without influenced by the communication time delay between the control units. Accordingly, the vehicle performance can be ensured while overcharge and overdischarge of the power storage device are prevented.

Still preferably, the first control unit drives and controls the first electric motor according to a smoothed torque command value obtained by a smoothing operation of smoothing a torque command value for the first electric motor in a direction of time. The estimation unit determines the input/output electric power estimate using a torque command value estimate determined by smoothing, in the direction of time, the torque command value for the first electric motor by a time constant smaller than a time constant used in the smoothing operation for obtaining the smoothed torque command value. On the other hand, the step of estimating determines the input/output electric power estimate using a torque command value estimate determined by smoothing, in the direction of time, the torque command value for the first electric motor by a time constant smaller than a time constant used in the smoothing operation for obtaining the smoothed torque command value.

In this way, for the first electric motor controlled by the first control unit that transmits data to the second control unit performing the electric power balance control, a torque command value estimate can be determined based on the torque command value and by correcting the communication delay time. Therefore, the second control unit can perform the electric power balance control with high accuracy, since the input/output electric power of the first electric motor can be estimated based on the torque command value estimate with the communication delay time corrected.

Preferably, based on a change rate of a rotational speed of the first electric motor, the estimation unit estimates a rotational speed of the first electric motor at a time when the communication delay time has passed, and the estimation unit determines the input/output electric power estimate using the estimated rotational speed of the first electric motor. On the other hand, based on a change rate of a rotational speed of the first electric motor, the step of estimating estimates a rotational speed of the first electric motor at a time when the communication delay time has passed, and the step of estimating determines the input/output electric power estimate using the estimated rotational speed of the first electric motor.

In this way, even in the state where the rotational speed of the first electric motor is changing, the rotational speed of the first electric motor can be estimated by making a correction for the communication time delay. Thus, the second control unit can perform the electric power balance control with high accuracy since the input/output electric power of the first electric motor can be estimated based on the estimated rotational speed with the communication time delay corrected.

Preferably, the first control unit sequentially calculates the input/output electric power of the first electric motor from a torque and a rotational speed of the first electric motor. The estimation unit determines the input/output electric power estimate at a time when the communication delay time has passed, based on the input/output electric power that is sequentially calculated and based on a change rate of the input/output electric power. On the other hand, the step of estimating determines the input/output electric power estimate at a time when the communication delay time has passed, based on the input/output electric power that is sequentially calculated and based on a change rate of the input/output electric power.

In this way, even in the state where the input/output electric power of the first electric motor is changing, the input/output electric power of the first electric motor can be estimated with the communication time delay corrected. Thus, the second control unit can perform the electric power balance control with high accuracy since the input/output electric power of the first electric motor can be estimated with the communication time delay corrected.

Preferably, the first electric motor is configured to be able to generate electric power as an engine is operated, and the second electric motor is configured to consume electric power and generate a vehicle drive power when operating in power running mode, and to generate an electric power when operating in regenerative braking mode.

In this way, the electric power balance control can be performed such that the sum of the input/output electric power of the first electric motor mainly serving as an electric generator and the second electric motor mainly serving as an electric motor for generating the vehicle drive power is kept within a predetermined range that is set according to the state of the power storage device. Thus, the vehicle performance can be ensured while the overcharge and overdischarge of the power storage device are prevented.

Still preferably, when the electric power balance control unit determines that an operational state of the first electric motor changes in a manner that increases an electric power generated by the first electric motor, the electric power balance control unit restricts the sum of the input/output electric power of the first electric motor and the input/output electric power of the second electric motor within the predetermined range, by using the input/output electric power of the first electric motor recognized as involving the communication delay time, instead of the input/output electric power estimate determined by the estimation unit. On the other hand, the control method further includes the steps of: determining whether or not an operational state of the first electric motor changes in a manner that increases an electric power generated by the first electric motor; and transmitting to the second control unit the input/output electric power of the first electric motor recognized as involving the communication delay time, instead of the input/output electric power estimate determined in the step of estimating, when it is determined that the operational state of the first electric motor changes in the manner that increases the electric power generated by the first electric motor. The step of restricting restricts the sum of the input/output electric power of the first electric motor and the input/output electric power of the second electric motor within the predetermined range, by using the input/output electric power of the first electric motor that is transmitted to the second control unit.

Specifically, the electric power balance control unit or the step of determining determines that the operational state of the first electric motor changes in the manner that increases the electric power generated by the first electric motor, when an absolute value of the torque command value changes to increase while the first electric motor generates the electric power. Alternatively, the electric power balance control unit or the step of determining determines that the operational state of the first electric motor changes in the manner that increases the electric power generated by the first electric motor, when an absolute value of the rotational speed changes to increase while the first electric motor generates the electric power. Alternatively, the first control unit sequentially calculates the input/output electric power of the first electric motor, and the electric power balance control unit or the step of determining determines that the operational state of the first electric motor changes in the manner that increases the electric power generated by the first electric motor, when an absolute value of the calculated input/output electric power changes to increase while the first electric motor generates the electric power.

Thus, when the operational state of the first electric motor changes in a manner that increases the generated electric power while the first electric motor generates the electric power, the estimation for correcting the communication time delay may be stopped so that the electric power balance control can be performed in safe manner in terms of the protection from overdischarge of the power storage device.

As seen from above, a chief advantage of the present invention is that the control apparatus for a hybrid vehicle configured to include control units (ECU) provided separately for respective electric motors can appropriately perform the electric power balance control for restricting the total electric power of the electric motors within a predetermined range while eliminating the influence of the communication time delay between the control units.

BEST MODES FOR CARRYING OUT THE INVENTION

Embodiments of the present invention will be hereinafter described in detail with reference to the drawings. In the drawings, like or corresponding components are denoted by like reference characters, and a detailed description thereof will not be repeated in principle.

Figure 1:
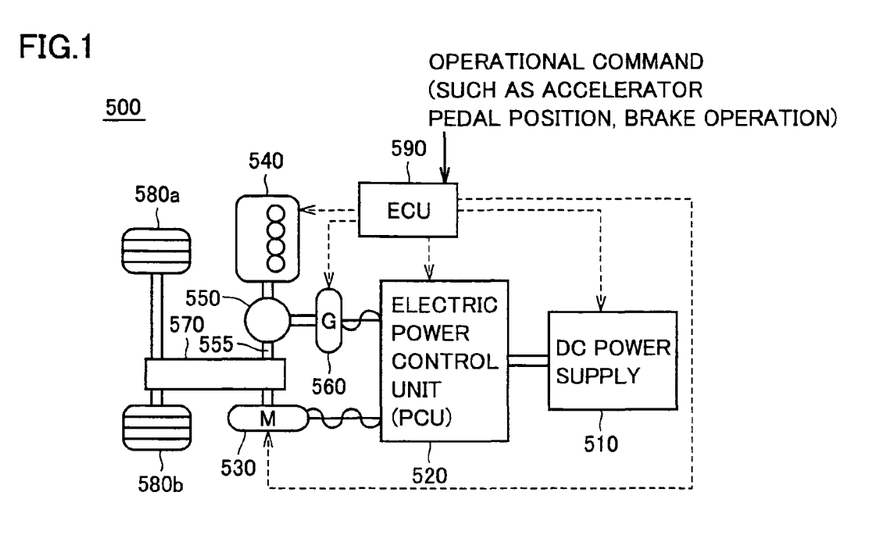
FIG. 1 is a schematic block diagram showing the entire configuration of a hybrid vehicle controlled by a control apparatus for a hybrid vehicle according to an embodiment of the present invention.

FIG. 1 is a schematic block diagram showing the entire configuration of a hybrid vehicle controlled by a control apparatus for a hybrid vehicle according to an embodiment of the present invention.

Referring to FIG. 1, hybrid vehicle 500 includes a DC (direct current) power supply 510, an electric power control unit (PCU) 520 performing electric power conversion for driving a motor, a motor generator 530 mainly operating as an electric motor, an engine 540, a power split device 550, a motor generator 560 mainly operating as an electric generator, a reduction gear unit 570, drive wheels 580a, 580b, and an ECU 590 controlling the whole operation of hybrid vehicle 500.

Motor generators 530, 560 correspond to "electric motor" of the present invention. In other words, the present embodiment applies a motor generator capable of operating as both of an electric motor and an electric generator, as one example of "electric motor." Although FIG. 1 shows the hybrid vehicle where only the front wheels are drive wheels, a 4WD (4-wheel drive) hybrid vehicle may be configured by providing an electric motor for driving the rear wheels.

DC power supply 510 is configured using a power storage device such as chargeable secondary battery (nickel-metal hydride or lithium-ion secondary battery for example) or electric double-layer capacitor. Electric power control unit 520 includes an inverter (not shown) for driving and controlling motor generator 530. The inverter converts a DC voltage supplied from DC power supply 510 into an AC (alternating current) voltage for driving motor generator 530. Further, the inverter is configured to be able to make a bidirectional electric power conversion and also has the capability of converting electric power (AC voltage) generated by regenerative braking operation of motor generator 530 into a DC voltage for charging DC power supply 510.

Further, electric power control unit 520 may also include a step up-and-down converter (not shown) performing a level conversion of the DC voltage. Such a step up-and-down converter can be provided to drive motor generator 530 by an AC voltage having the amplitude of a higher voltage than the supply voltage of DC power supply 510, and thus the motor drive efficiency can be improved.

Engine 540 burns fuel to output a drive power. Power split device 550 is coupled with engine 540, motor generator 530 and motor generator 560 and splits the mechanical power therebetween. In other words, the drive power generated by engine 540 can be split between a path for transmitting the power via reduction gear unit 570 to drive wheels 580a, 580b and a path for transmitting the power to motor generator 560.

As power split device 550, for example, a planetary gear system may be used that has three rotational shafts for a sun gear, a planetary carrier and a ring gear. The three rotational shafts are connected to respective rotational shafts of engine 540, motor generator 530 and motor generator 560. For example, motor generator 560 may be provided with a hollow rotor having its center through which the crankshaft of engine 540 is passed, so that engine 540, motor generator 530 and motor generator 560 can be mechanically connected to power split device 550. Specifically, the rotor of motor generator 560 is connected to the sun gear, the crankshaft of engine 540 is connected to the planetary carrier and an output shaft 555 is connected to the ring gear. The rotation of output shaft 555 is transmitted via reduction gear unit 570 to drive wheels 580a, 580b.

Thus, motor generator 560 is rotated by the drive power from engine 540 that is transmitted via power split device 550 to generate electric power. Electric power control unit 520 further includes another inverter (not shown) for driving and controlling motor generator 560. This inverter converts electric power (AC voltage) generated by motor generator 560 into a DC voltage used as electric power for charging DC power supply 510 or electric power for driving motor generator 530. Further, this inverter may be configured to be able to make a bidirectional electric-power conversion, and the DC voltage from DC power supply 510 may be used to allow motor generator 560 to operate as an electric motor for engine 540 so that engine 540 can be started.

Motor generator 530 is rotated and driven by means of the AC voltage supplied from electric power control unit 520, and the resultant drive power is transmitted via output shaft 555 and reduction gear unit 570 to drive wheels 580a, 580b and used as the vehicle drive power. Further, in regenerative braking operation in which motor generator 530 is rotated as drive wheels 580a, 580b decelerate, motor generator 530 serves as the electric generator.

When hybrid vehicle 500 is in a light-load state such as the state where the vehicle starts running, the vehicle is running at a low speed or descending a moderate slope, the hybrid vehicle runs with the drive power from motor generator 530 without using the drive power from engine 540, so as to avoid a low-efficiency region of the engine. Therefore, in this case, the operation of engine 540 is stopped unless warm-up operation is necessary or motor generator 560 has to be driven to charge DC power supply 510. When such warm-up operation or charging is required, engine 540 is operated in idle state.

In a normal running state, engine 540 is started and the drive power that is output from engine 540 is split by power split device 550 into the drive power for drive wheels 580a, 580b and the drive power for generating electric power by motor generator 560. The electric power generated by motor generator 560 is used to drive motor generator 530. Thus, in the normal running state, the drive power by motor generator 530 assists the drive power by engine 540 to drive the drive wheels 580a, 580b. Further, in an acceleration mode of full throttle, the electric power supplied from DC power supply 510 is further used for driving motor generator 530, so that the power for driving drive wheels 580a, 580b further increases.

In the state of deceleration and braking, motor generator 530 is rotated and driven by drive wheels 580a, 580b to generate electric power. The electric power collected by regenerative power generation of motor generator 530 is converted into a DC voltage by electric power control unit 520, and is used for charging DC power supply 510. When the vehicle is stopped, engine 540 is automatically stopped.

As described above, hybrid vehicle 500 uses a combination of the drive power generated by engine 540 and the drive power generated by motor generator 530 from electric energy, specifically, controls the operation of engine 540 and the operation of motor generator 530 according to vehicle conditions, and thereby drives the vehicle with improved fuel efficiency. Hybrid ECU 590 controls the ratio between the drive power to be generated by motor generator 530 and the drive power to be generated by engine 540 according to vehicle conditions and based on an operational command (accelerator pedal position, brake operation for example).

Figure 2:
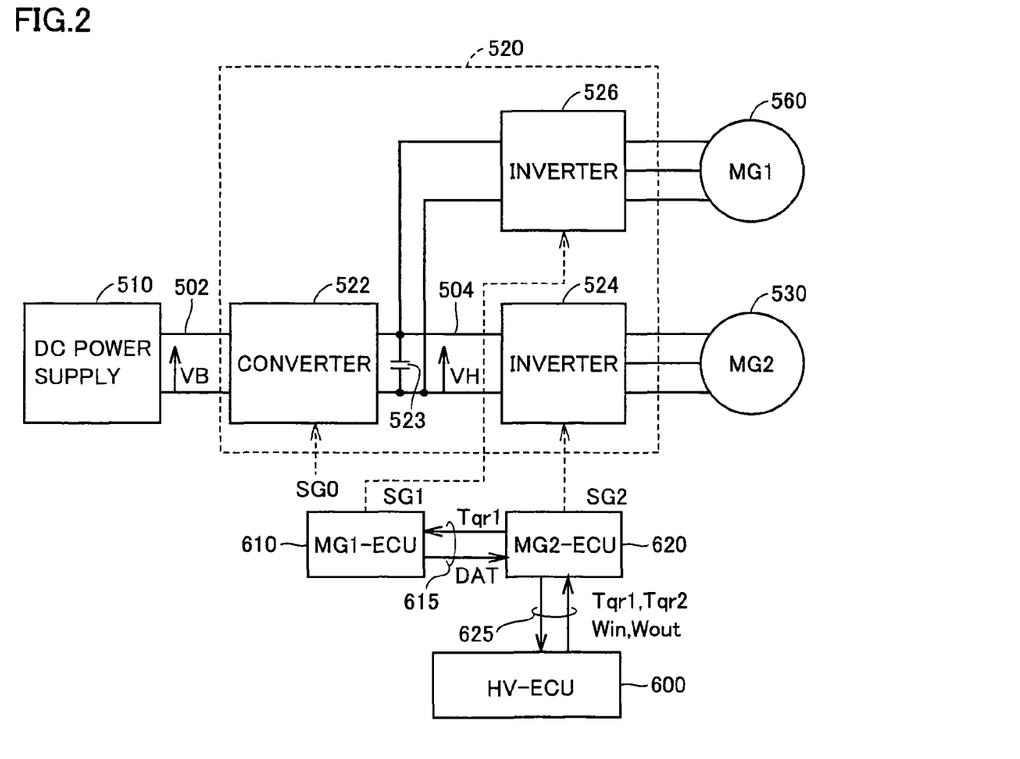
FIG. 2 is a block diagram illustrating in more detail a control configuration for motor generators shown in FIG. 1.

FIG. 2 is a block diagram illustrating in more detail the control configuration for motor generator 530 (MG2) and motor generator 560 (MG1) as shown in FIG. 1.

Referring to FIG. 2, chargeable DC power supply 510 outputs a DC voltage VB to a power supply line 502. Electric power control unit 520 includes a converter 522, a smoothing capacitor 523 and inverters 524, 526. The operations of converter 522 and inverters 524, 526 in electric power control unit 520 are controlled respectively by an MG2-ECU 620 and an MG1-ECU 610 provided separately for respective motor generators.

Converter 522 is a step up-and-down converter capable of performing a bidirectional voltage conversion that is configured to include an electric-power semiconductor switching element (not shown) such as an IGBT (Insulated Gate Bipolar Transistor), an electric-power MOS (Metal Oxide Semiconductor) transistor or an electric-power bipolar transistor. Converter 522 is switching-controlled in response to switching control signal SG0 to step up DC voltage VB from power supply line 502 to provide a DC voltage VH to a power supply line 504. Converter 522 may also be switching-controlled in response to switching control signal SG0 to step down DC voltage VH of power supply line 504 to output DC voltage VB to power supply line 502. The voltage conversion ratio (step-up ratio or step-down ratio) of converter 522 is variably controlled by means of switching control signal SG0.

Motor generator 530 (MG2) and motor generator 560 (MG1) are each configured typically with a three-phase synchronous electric motor including a stator (not shown) on which three-phase coil windings are provided and a rotor (not shown) and serving as a motor generator having both of the functions of the electric motor and the electric generator.

Inverters 524, 526 are each a commonly-used three-phase inverter configured using an electric-power semiconductor switching element. Therefore, a detailed description of the configuration is not given here.

Inverter 524 converts DC voltage VH supplied from power supply line 504 into a three-phase AC voltage by on-off control (switching-control) of electric-power semiconductor switching elements (not shown) in response to switching control signal SG2 from MG2-ECU 620, and the inverter can output the three-phase AC voltage as converted to motor generator 530 (MG2). Accordingly, motor generator 530 is driven and controlled to generate an output torque according to a torque command value.

Further, in regenerative braking operation of hybrid vehicle 500, motor generator 530 receives the rotational force from wheels 580a, 580b to generate a three-phase AC voltage, and inverter 524 can convert the three-phase AC voltage into a DC voltage under switching control according to switching control signal SG2 to output the DC voltage as converted to power supply line 504. In this way, inverter 524 performs the bidirectional electric power conversion for MG2 (motor generator 530).

The regenerative braking here includes braking accompanied by regenerative power generation that is effected when a driver of the hybrid vehicle steps on the foot brake as well as deceleration (or stop of acceleration) of the vehicle accompanied by regenerative power generation that is effected when the driver releases the accelerator pedal without operating the foot brake.

Inverter 526 can be switching-controlled in response to switching control signal SG1 from MG1-ECU 610 to allow motor generator 560 to generate an output torque according to a torque command value. Further, in the case where motor generator 560 is driven by engine 540 to generate electric power, inverter 526 is switching-controlled in response to switching control signal SG1 to convert a three-phase AC voltage generated by motor generator 560 into a DC voltage and output the DC voltage as converted to power supply line 504. In this way, inverter 526 performs the bidirectional electric power conversion for MG1 (motor generator 560).

ECU 590 shown collectively in FIG. 1 has a hierarchical structure including an HV-ECU 600 as a higher-rank ECU, and MG1-ECU 610 and MG2-ECU 620 provided independently for respective MG1 and MG2.

HV-ECU 600 generates torque command values Tqr1, Tqr2 for MG1, MG2 based on an operational command (such as acceleration command, brake command) and according to vehicle conditions.

HV-ECU 600 also generates a command value for DC voltage VH so that MG1 and MG2 can be driven in an optimum state, according to the operational states of MG1 and MG2 that are transmitted via a communication path 625. These operational commands are transmitted via communication path 625 to MG2-ECU 620. Between MG2-ECU 620 and MG1-ECU 610, a communication path 615 is further provided. Typically, communication paths 615, 625 are configured using a wireless and/or wired LAN (Local Area Network). Thus, data, information or the like can be transmitted and received between HV-ECU 600, MG1-ECU 610 and MG2-ECU 620. In the exemplary configuration of FIG. 2, a communication path may be further provided between HV-ECU 600 and MG1-ECU 610.

Converter 522 operates in response to switching control signal SG0 to output an output voltage according to a voltage command value for DC voltage VH that is set by HV-ECU 600, or MG1-ECU 610 or MG2-ECU 620. MG1-ECU 610 and MG2-ECU 620 generate switching control signals SG1, SG2 so that operational control (electric motor control) for MG1 and MG2 is performed according to an operational command value from HV-ECU 600. In other words, the DC-AC voltage conversion of inverters 524, 526 is controlled so that MG1, MG2 output an output torque according to the torque command value.

Further, hybrid vehicle 500 is configured to hold an electric power balance in a manner that the input/output electric power of DC power supply 510 compensates for an excess or deficiency of the electric power of motor generators MG1, MG2 as a whole that is represented by the sum of the input/output electric power of MG1 which basically operates as an electric generator (the input/output electric power is also referred to as MG1 electric power hereinafter) and the input/output electric power of MG2 which basically operates as an electric motor for generating the drive power for the vehicle (the input/output electric power is also referred to as MG2 electric power hereinafter). In the following description, the MG1 electric power and the MG2 electric power are each represented by a positive value (>0) when the electric power is consumed and represented by a negative value (<0) when the electric power is generated.

In hybrid vehicle 500, when the electric power consumed by MG2 suddenly increases due to occurrence of a skid or the like, an increase of the electric power generated by MG1 could be insufficient and accordingly the electric power could be suddenly taken away from DC power supply 510, which could adversely affect the lifetime of DC power supply 510.

Therefore, in hybrid vehicle 500, an allowable output electric power Wout (>0) representing an allowable value of the output electric power from DC power supply 510 and an allowable input electric power Win (<0) representing an allowable value of the input electric power (charging electric power) to DC power supply 510 are sequentially set according to the state of DC power supply 510 (such as state of charge: SOC and battery temperature for example), and the electric power balance control is performed based on the set allowable input electric power Win and allowable output electric power Wout and according to formula (1) below.

$$Win \leq (Pm1+Pm2) \leq Wout \quad (1)$$

In formula (1), Pm1 is the MG1 electric power and Pm2 is the MG2 electric power. Actually, it is preferable to consider a loss Ploss generated at inverters 524, 526 and motor generators MG1, MG2 and perform the electric power balance control so that (Pm1+Pm2+Ploss) is in the range of Win to Wout. For the sake of convenience of description, however, it is supposed hereinafter that the electric power balance control is performed according to formula (1).

Under the above-described electric power balance control, Pm1+Pm2 is sequentially monitored and, when Pm1+Pm2 is out of the range of Win to Wout, a restriction is imposed by correcting at least one of Pm1 and Pm2 so that the consumed electric power or generated electric power of the motor generators as a whole is not excessively large. Thus, in order to immediately effect the electric power balance control, it is preferable to perform the electric power balance control by an ECU that directly controls the motor generators, namely by MG1-ECU 610 or MG2-ECU 620 rather than by HV-ECU 600.

In the present embodiment, it is necessary to restrict the electric power of motor generator MG2 which chiefly operates as an electric motor for driving the vehicle and accordingly consumes the electric power. Therefore, a control configuration for performing the electric power balance control by MG2-ECU 620 will be illustrated.

MG2-ECU 620 transmits to MG1-ECU 610 torque command value Tqr1 from HV-ECU 600. MG1-ECU 610 generates switching control signal SG1 for performing switching control of inverter 526, so that MG1 generates an output torque according to the transmitted torque command value Tqr1.

MG1-ECU 610 sequentially transmits to MG2-ECU 620 data DAT for recognizing MG1 electric power Pm1. MG2-ECU 620 has the capability of correcting torque command value Tqr2 as required so that the sum of MG2 electric power Pm2 obtained based on the operational state (typically torque command value and rotational speed) of MG2 and MG1 electric power Pm1 recognized based on the data received from MG1-ECU 610 satisfies formula (1).

Specifically, MG2-ECU 620 performs the electric power balance control by setting an upper limit T2max (Wout side) and a lower limit T2 min (Win side) of the torque command value for MG2 according to following formulas (2) and (3), and restricting the actual torque command value within the range of T2min to T2max. In formulas. (2) and (3), Nm2 represents the rotational speed (rpm) of MG2.

$$T2max = (Wout - Pm1)/(2\pi \cdot Nm2/60) \quad (2)$$

$$T2min = (Win - Pm1)/(2\pi \cdot Nm2/60) \quad (3)$$

In the following, an influence of a communication delay time generated between ECUs on the electric power balance control performed by MG2-ECU 620 will be described with reference to FIG. 3.

Figure 3:
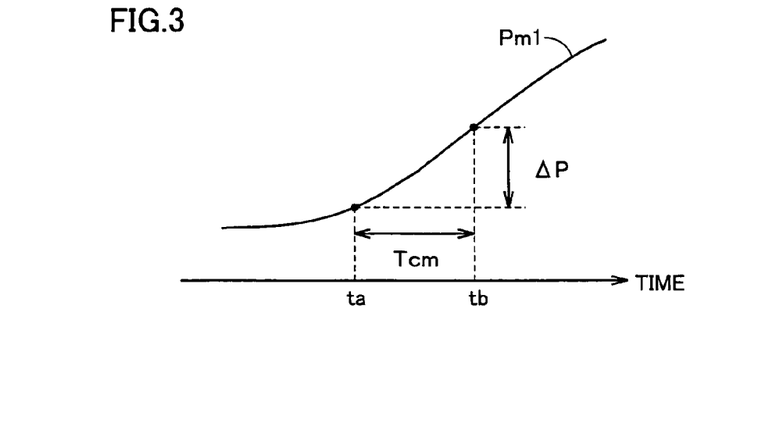
FIG. 3 is a schematic diagram illustrating an influence of a communication delay time generated between ECUs on the electric power balance control.

Referring to FIG. 3, while MG1 electric power Pm1 is changing, MG1 electric power Pm1 at time ta is recognized by MG2-ECU 620 at time tb, namely after a communication delay time Tcm from time ta, and used for the electric power balance control at time tb.

The actual MG1 electric power, however, has changed by ΔP at time tb relative to the MG1 electric power at time ta. Therefore, the electric power balance control at time tb is performed involving ar error ΔP of MG1 electric power Pm1. Particularly in recent years, the power output of the hybrid vehicle has been increasing and the use of a configuration including a reduction gear unit between the vehicle-driving MG2 and the output shaft has been started. In such a hybrid vehicle, the power output of the vehicle per unit time sharply changes and accordingly a variation per unit time of MG1 electric power Pm1 and MG2 electric power Pm2 is larger.

As a result, a variation of Pm1, Pm2 in communication delay time Tcm between ECUs is larger and thus ΔP in FIG. 3 is larger. A problem accordingly occurs of deterioration in accuracy of the electric power balance control based on formula (1).

In order to address this problem, the control apparatus for a hybrid vehicle according to the embodiment of the present invention performs the following electric power balance control.

Figure 4:
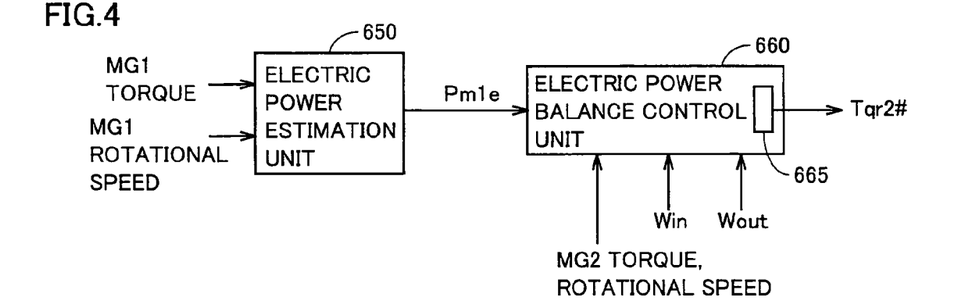
FIG. 4 is a schematic block diagram illustrating the electric power balance control by the control apparatus for a hybrid vehicle according to the embodiment of the present invention.

FIG. 4 is a schematic block diagram illustrating the electric power balance control by the control apparatus for a hybrid vehicle according to the embodiment of the present invention.

Referring to FIG. 4, an electric power estimation unit 650 generates an estimate Pm1e of MG1 electric power Pm1 based on the torque and rotational speed of MG1. An electric power balance control unit 660 performs the electric power balance control illustrated by formulas (1) to (3) based on the torque and rotational speed of MG2 and allowable input electric power Win and allowable output electric power Wout of DC power supply 510. Specifically, electric power balance control unit 660 includes a torque restriction unit 665 generating a final torque command value Tqr2# for MG2 so that the torque command value for MG2 is restricted within the range of T2min to T2max determined by formulas (2) and (3) as required, based on the electric power balance control.

Figure 5:
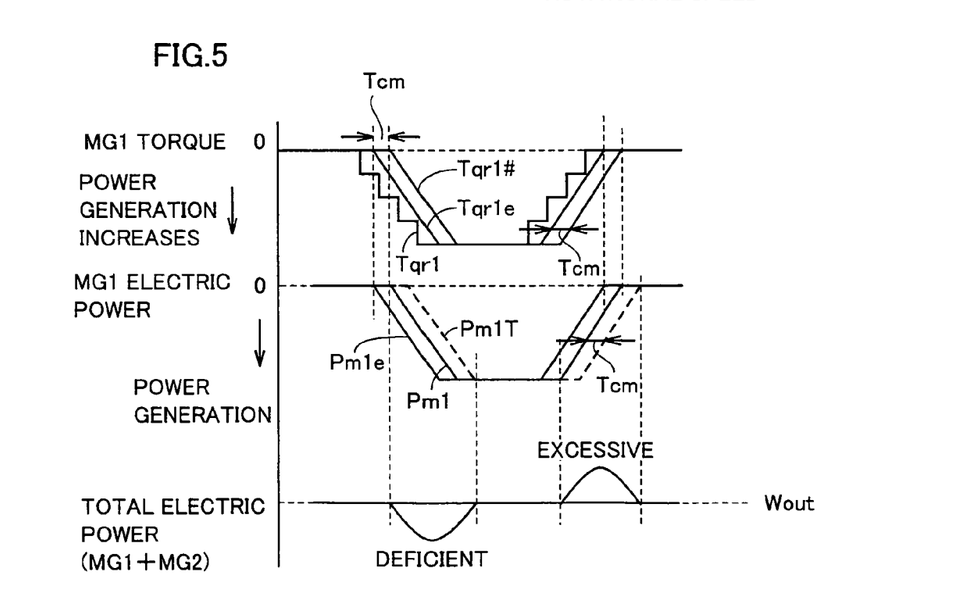
FIG. 5 is a waveform chart illustrating a function of an electric power estimation unit.

FIG. 5 shows changes of the MG1 torque and the MG1 electric power while the rotational speed of MG1 is constant, in order to illustrate the function of electric power estimation unit 650.

Referring to FIG. 5, the actual torque command value Tqr1# of MG1 is obtained by smoothing, in the direction of time, torque command value Tqr1 from HV-ECU 600. Namely, torque command value Tqr1# corresponds to "smoothed torque command value."

In the example of FIG. 5 where the MG1 rotational speed is constant, as torque command value Tqr1 decreases in stepwise manner from zero, the negative torque of MG1 increases according to torque command value Tqr1#. Accordingly, the electric power generated by MG1 increases and the absolute value of MG1 electric power Pm1 gradually increases.

In the case, however, where MG2-ECU 620 performs the electric power balance control based on the actual torque command value Tqr1# or MG1 electric power Pm1, the MG1 electric power recognized by MG2-ECU 620 is Pm1T indicated by the dotted line in the drawing due to the influence of communication delay time Tcm. As a result, in the process where the electric power generated by MG1 increases, the electric power balance control is performed using the underestimated amount of electric power generated by MG1. Thus, the total electric power of MG1 and MG2 could be insufficient relative to allowable output electric power Wout. Accordingly, the output electric power MG2, namely generation of the vehicle drive power could be excessively restricted and the vehicle performance could not be derived sufficiently.

In contrast, in a process where the electric power generated by MG1 decreases, torque command value Tqr1 increases in stepwise manner toward zero, and accordingly actual torque command value Tqr1# is smoothed and changed toward zero. In this case as well, the MG1 electric power recognized by MG2-ECU 620 is Pm1T indicated by the dotted line in the drawing due to the influence of communication delay time Tcm. Therefore, in this process, the electric power generated by MG1 is recognized as an excessively large. The total electric power of MG1 and MG2 thus exceeds allowable output electric power Wout, and excessive discharge of DC power supply 510 could occur. Particularly in the process where MG1 electric power Pm1 gradually increases, electric power error ΔP (FIG. 3) is continuously generated so that the output electric power from DC power supply 510 is continuously excessively large. Thus, the lifetime of the DC power supply could be adversely affected.

Therefore, in the present embodiment, electric power estimation unit 650 generates electric power estimate Pm1e with communication delay time Tcm corrected, and Pm1e is used as Pm1 in formula (1). Thus, the electric power balance control is performed appropriately.

For example, as shown in FIG. 5, torque estimate Tqr1e is generated with communication delay Tcm corrected with respect to torque command value Tqr1#. According to this torque estimate Tqr1e and MG1 rotational speed Nm1 (rpm), MG1 electric power estimate Pm1e with communication delay Tcm corrected can be determined according to formula (4) below.

$$Pm1e = Tqr1e \cdot Nm1 \cdot (2\pi/60) \quad (4)$$

As seen from FIG. 5, MG1 electric power estimate Pm1e is used for the electric power balance control at the time when communication delay time Tcm has passed, and thus the MG1 electric power recognized by MG2-ECU 620 is identical to the actual MG1 electric power Pm1.

Figure 6:
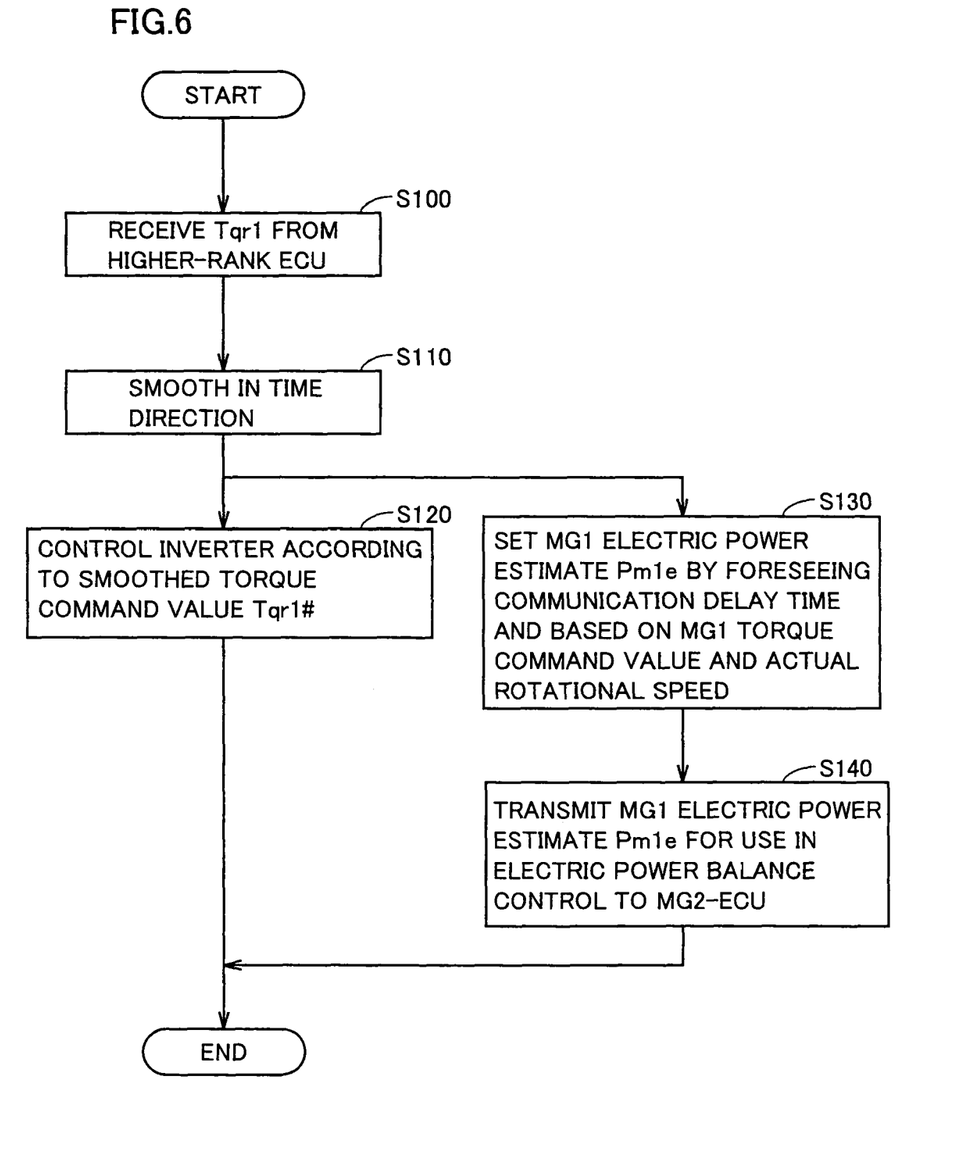
FIG. 6 is a flowchart illustrating a control process of an MG1-ECU regarding the electric power balance control in the embodiment of the present invention.

FIG. 6 is a flowchart illustrating a control process of MG1-ECU 610 regarding the electric power balance control in the embodiment of the present invention.

Referring to FIG. 6, MG1-ECU 610 receives torque command value Tqr1 from a higher-rank ECU in step S100. In the exemplary configuration of FIG. 2, torque command value Tqr is generated by HV-ECU 600 and transmitted through communication paths 615, 625 via MG2-ECU 620.

MG1-ECU 610 smoothes, in the direction of time, torque command value Tqr1 received in step S100 to generate actual torque command value Tqr1# in step S110. Further, in step S120, MG1-ECU 610 controls inverter 526 so that MG1 outputs the torque according to torque command value Tqr1# as smoothed.

In step S130, MG1-ECU 610 generates MG1 electric power estimate Pm1e by foreseeing (correcting) communication delay time Tcm and based on the torque command value and the actual rotational speed of MG1. In step S140, MG1-ECU 610 transmits MG1 electric power estimate Pm1e for use in the electric power balance control to MG2-ECU 620.

Figure 7:
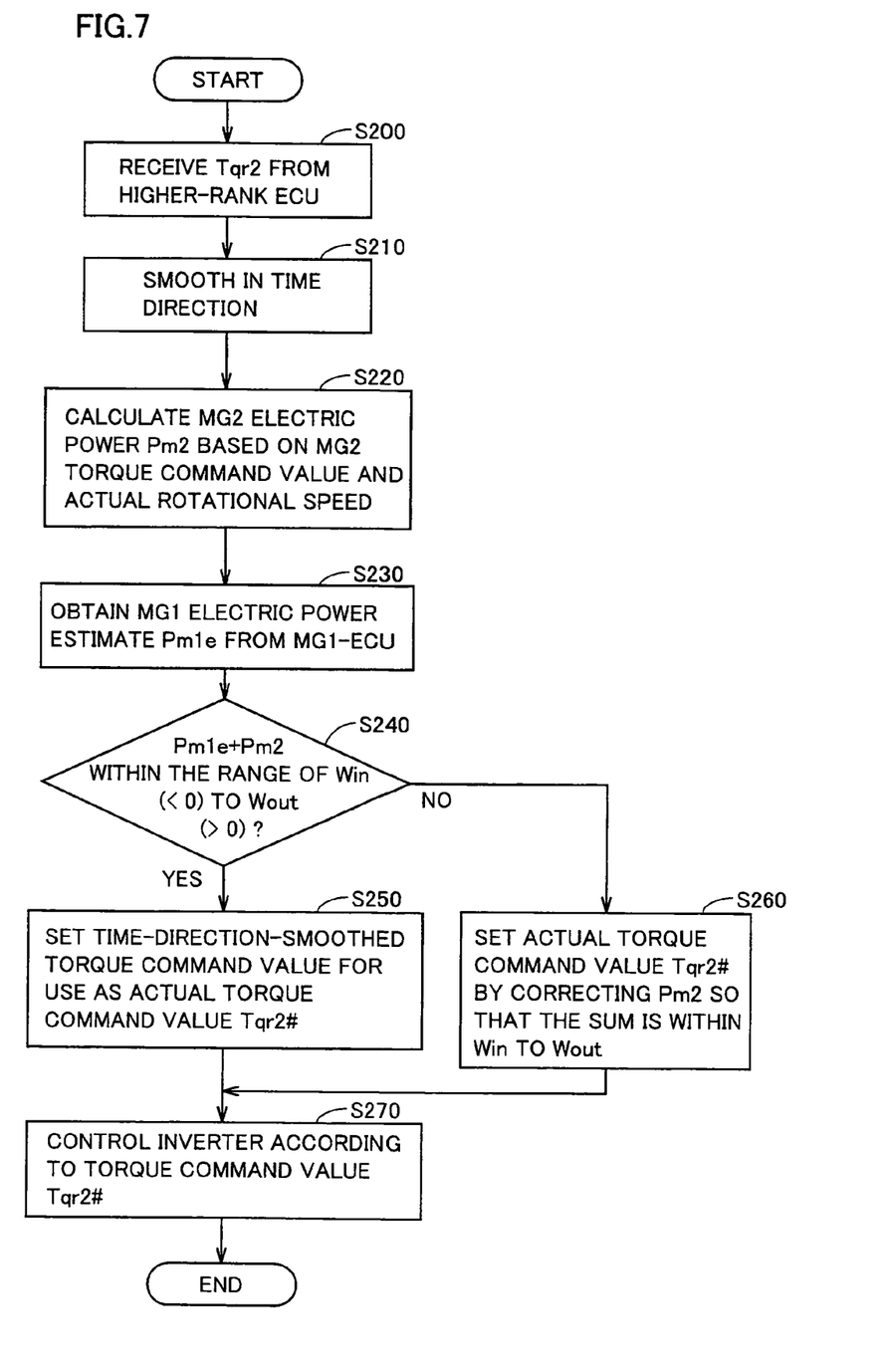
FIG. 7 is a flowchart illustrating a control process of an MG2-ECU regarding the electric power balance control in the embodiment of the present invention.

FIG. 7 is a flowchart showing a control process of MG2-ECU 620 for the electric power balance control in the embodiment of the present invention.

Referring to FIG. 7, MG2-ECU 620 receives in step S200 torque command value Tqr2 from HV-ECU 600 which is a higher-rank ECU, and smoothes in step S210 torque command value Tqr2 in the direction of time. Further, MG2-ECU 620 calculates in step S220 MG2 electric power Pm2 based on torque command value Tqr2 smoothed in step S210 and actual MG2 rotational speed Nm2.

In step S230, MG2-ECU 620 obtains MG1 electric power estimate Pm1e from MG1-ECU 610. In step S240, MG2-ECU 620 determines whether or not the total electric power Pm1e+Pm2 that is the sum of the MG1 electric power estimate obtained in S230 and the MG2 electric power calculated in S220 is within the range of Win to Wout.

When the relation Win≦Pm1e+Pm2<Wout is satisfied (the determination is YES in S240), MG2-ECU 620 uses torque command value Tqr2 smoothed in the direction of time directly as actual torque command value Tqr2# in step S250.

In contrast, when the total electric power Pm1e+Pm2 is out of the range of Win to Wout (the determination is NO in S240), MG2-ECU 620 corrects the torque command value to torque upper limit T2max and torque lower limit T2min determined udsing MG1 electric power estimate Pm1e instead of Pm1 in formulas (2) and (3) in step S260. Specifically, when the smoothed torque command value is larger than T2max, the actual torque command value is set as Tqr2#=T2max to impose a restriction so that a torque command value exceeding the torque upper limit (positive direction) will not be generated. Similarly, when the smoothed torque command value is smaller than T2min, the actual torque command value is set as Tqr2#=T2min to impose a restriction so that a torque command value smaller than the torque lower limit (negative direction) will not be generated. Thus, the process in S260 corresponds to the state where the MG2 torque command value is restricted and accordingly MG2 electric power Pm2 is corrected by the electric power balance control according to formula (1).

Further, in step S270, MG2-ECU 620 controls inverter 524 so that MG2 generates an output torque according to torque command value Tqr2# that is set in step S250 or S260.

With the configuration as described above, the electric power balance control is performed by MG2-ECU 620 that can most speedily control MG2 whose electric power is restricted based on the electric power balance control, and the electric power balance control can be performed highly accurately without influenced by a communication time delay between ECUs. Accordingly, the hybrid vehicle can be controlled with the vehicle performance ensured, while overcharge and overdischarge of DC power supply 510 is prevented, namely the lifetime of the DC power supply (power storage device) is not adversely affected.

An embodiment regarding a method for obtaining MG1 electric power estimate Pm1e will be described in more detail below.

As shown in formula (4), the MG1 electric power can be calculated as the product of the torque command value and the actual rotational speed of MG1.

Figure 8:
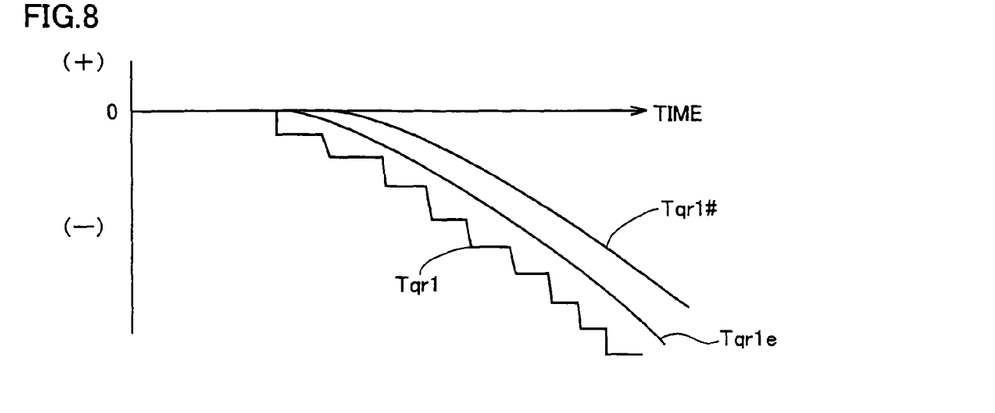
FIG. 8 is a schematic diagram illustrating a method for obtaining a torque estimate with a communication delay time corrected.

Therefore, as shown in FIG. 8, when actual torque command value Tqr1# is determined by smoothing, in the direction of time, the original torque command value Tqr1 (stepwise) set by HV-ECU 600, another filter whose time constant for smoothing is shorter by communication delay time Tcm than that of a smoothing filter used for determining Tqr1# is separately prepared. Output Tqr1 of this filter can be used to obtain torque estimate Tqr1e with communication delay time Tcm corrected with respect to the smoothed actual torque command value Tqr1#. Thus, MG1 electric power estimate Pm1e can be determined using this torque estimate Tqr1e, specifically determined based on the product of torque estimate Tqr1e and actual rotational speed Nm1 of MG1.

Figure 9:
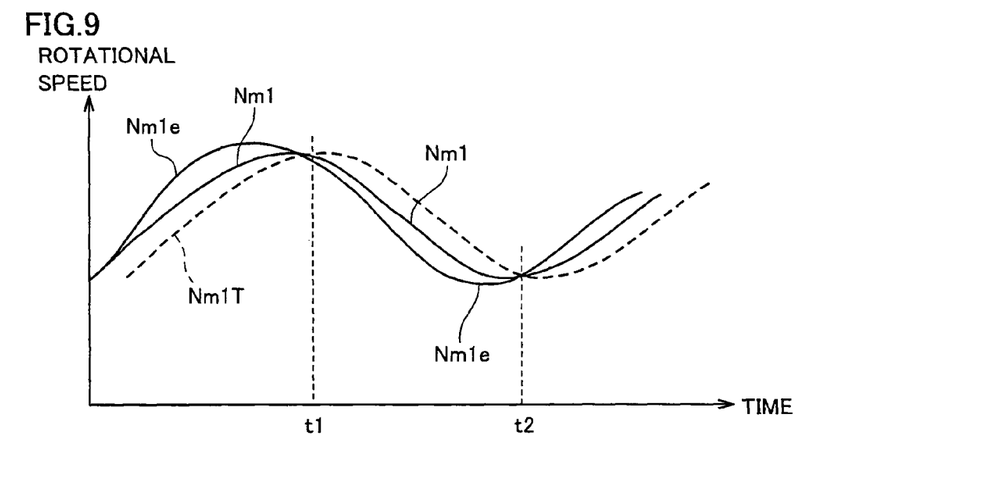
FIG. 9 is a schematic diagram illustrating a method for obtaining a rotational speed estimate with a communication delay time corrected.

Alternatively, in order to address the case where the rotational speed of MG1 is changing, an estimate of the rotational speed with the communication delay time corrected may be determined as shown in FIG. 9.

Referring to FIG. 9, while the rotational speed of MG1 is changing, if actual value Nm1 is transmitted as it is from MG1-ECU 610 to MG2-ECU 620, the actual MG1 rotational speed reflected on the electric power balance control is Nm1T (dotted line in the drawing) that involves a communication delay time.

As to the rotational speed of MG1, together with actual value Nm1, the time rate of change of the rotational speed Km1 (rpm/s) at that time can be calculated to determine MG1 rotational speed estimate Nm1e according to formula (5) below.

$$Nm1e = Nm1 + Km1 \cdot Tcm \quad (5)$$

Then, MG1 rotational speed estimate Nm1e is used, specifically, based on the product of MG1 rotational speed estimate Nm1e and the torque command value, MG1 electric power estimate Pm1e is determined. Thus, the electric power balance control can be achieved while eliminating the influence of the communication delay time even while the MG1 rotational speed is changing.

Figure 10:
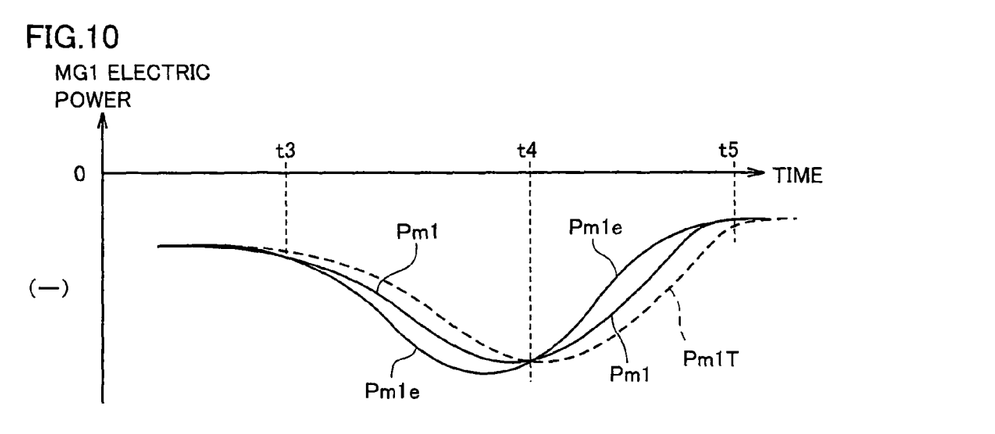
FIG. 10 is a schematic diagram illustrating a method for obtaining an electric power estimate with a communication delay time corrected.

Alternatively, as shown in FIG. 10, MG1 electric power Pm1 may be sequentially calculated based on the product of torque command value Tqr1# and actual rotational speed Nm1, and the electric power balance control may be performed based on the calculated MG1 electric power Pm1.

In this case, if MG1 electric power Pm1 calculated by MG1-ECU 610 is transmitted as it is to MG2-ECU 620, the MG1 electric power reflected on the electric power balance control is Pm1T (dotted line in the drawing) that involves the communication delay time.

Therefore, similarly to the estimation of actual rotational speed Nm1 in FIG. 9, the time rate of change KP1 (W/s) can be determined together with the calculation of MG1 electric power Pm1, so that MG1 electric power estimate Pm1e can be determined according to formula (6) below.

$$Pm1e = Pm1 + KP1 \cdot Tcm \quad (6)$$

The electric power balance control can be performed according to thus determined MG1 electric power estimate Pm1e, so that the electric power balance control can be performed while eliminating the influence of communication delay time even when the MG1 electric power is changing.

Modification

As described above, when the amount of electric power generated by MG1 is changing to decrease, an error in the electric power balance control due to a communication delay time causes the output electric power from DC power supply 510 to become excessively large. In contrast, when the amount of electric power generated by MG1 is changing to increase, an error in the electric power balance control due to a communication delay provides safety in terms of overdischarge of DC power supply 510. Thus, according to a modification of the present embodiment described below, the electric power balance control based on the electric power estimation considering the above-described communication delay time is stopped when the generated electric power of MG1 is increasing and is performed only when the generated electric power is decreasing.

Figure 11:
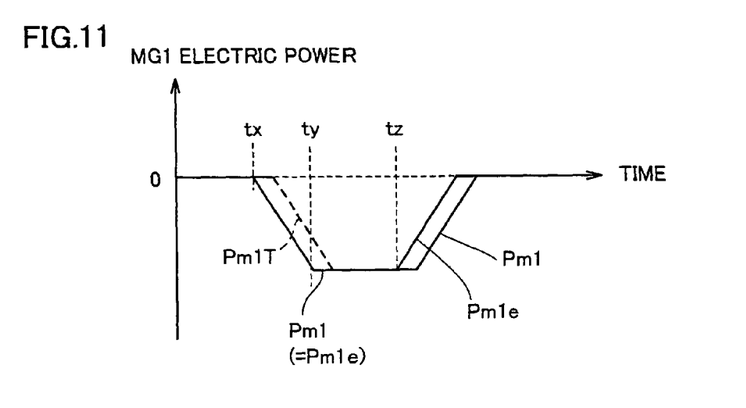
FIG. 11 is a waveform chart illustrating the electric power balance control according to a modification of the embodiment of the present invention.

FIG. 11 schematically shows electric power balance control according to the modification of the embodiment of the present invention.

Referring to FIG. 11, an operational pattern is shown where MG1 starts generating electric power at time tx, the amount of generated electric power thereafter gradually decreases from time tz and the generation of electric power is then ended. In the period (from time tx to time ty) in which the MG1 electric power Pm1 is decreasing, namely the generated electric power is increasing, communication delay time Tcm is not corrected and the electric power balance control is performed using the actual MG1 electric power Pm1 directly as MG1 electric power estimate Pm1e.

Accordingly, the electric power balance control is performed based on MG1 electric power Pm1T influenced by the communication delay time. While the generated electric power is increasing, the amount of electric power generated by MG1 is recognized as excessively smaller. Therefore, the electric power balance control can be performed in safety manner in terms of the overdischarge of DC power supply 510 as a result of the fact that the total electric power of MG1 and MG2 exceeds allowable output electric power Wout.

In contrast, in a period in which MG1 electric power Pm1 is increasing, namely the generated electric power is decreasing (after time tz), electric power estimate Pm1e with communication time delay Tcm corrected with respect to actual MG1 electric power Pm1 is used to perform the electric power balance control, which is similar to the above-described embodiment. Thus, when the amount of electric power generated by MG1 is decreasing, the decrease of the amount of electric power generated by MG1 is appropriately predicted and thus the electric power balance control can be accurately performed to prevent overdischarge of DC power supply 510.

Figure 12:
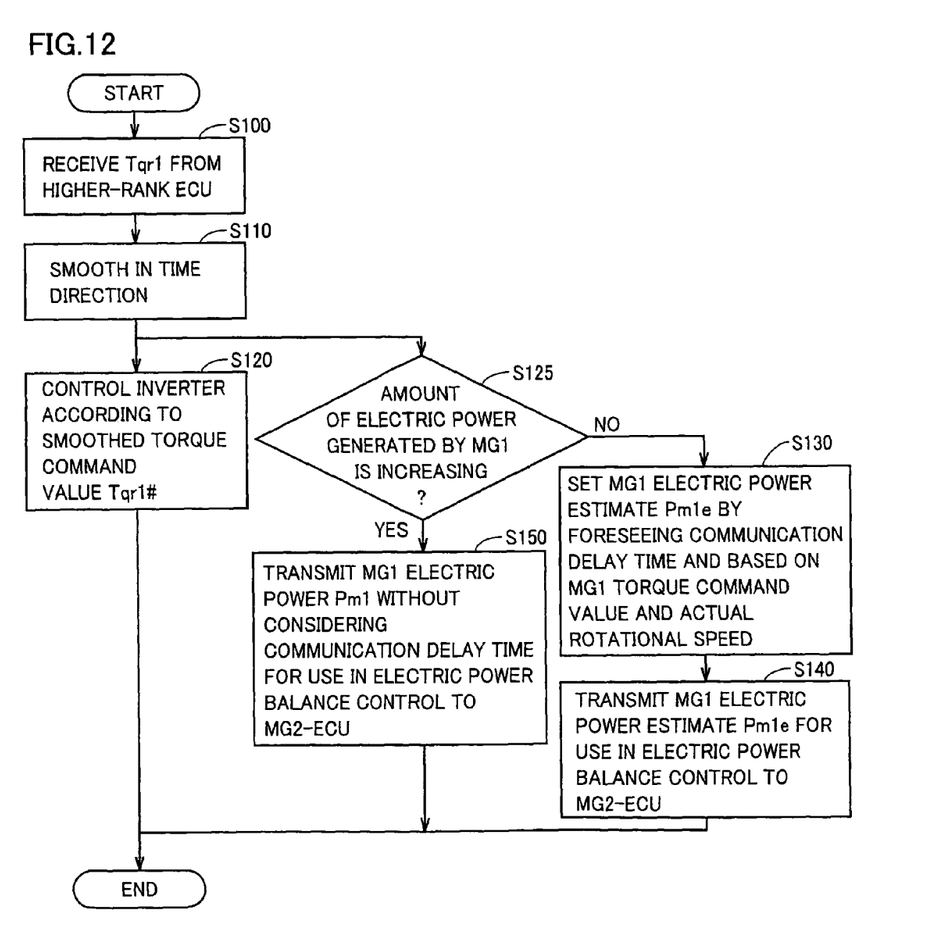
FIG. 12 is a flowchart illustrating a control process of the MG1-ECU regarding the electric power balance control according to the modification of the embodiment of the present invention.

FIG. 12 is a flowchart illustrating a control process of the MG1-ECU for the electric power balance control according to the modification of the embodiment of the present invention.

Regarding the electric power balance control of the modification of the embodiment, FIG. 12 differs from FIG. 6 in that MG1-ECU 610 further performs step S125 and step S150 in addition to the steps shown in FIG. 6.

MG1-ECU 610 determines whether or not the amount of electric power generated by MG1 is increasing in step S125. In step S125, according to the fact that the absolute value of torque command value Tqr1# is increasing while MG1 is generating electric power, it can be determined that the amount of electric power generated by MG1 is increasing. Alternatively, according the fact that the absolute value of the MG1 rotational speed is increasing while MG1 is generating electric power, it can also be determined that the amount of electric power generated by MG1 is increasing. Further, based on the product of torque command value Tqr1# and MG1 rotational speed Nm1, MG1 electric power Pm1 may be sequentially calculated and, based on whether the calculated MG1 electric power Pm1 is positive or negative and whether the MG electric power is changing to increase or decrease, the determination in step S125 may also be made.

When the amount of electric power generated by MG1 is not increasing (the determination is NO in S125), MG1-ECU 610 performs steps S130 and S140 similar to those of FIG. 6 to transmit MG1 electric power estimate Pm1e for use in the electric power balance control to MG2-ECU 620.

In contrast, when the amount of electric power generated by MG1 is increasing (the determination is YES in S125), MG1-ECU 610 transmits in step S150 MG1 electric power Pm1 for which the communication delay time is not considered, for use in the electric power balance control, to MG2-ECU 620.

Thus, in the period in which the amount of electric power generated by MG1 is increasing, such as the period from time tx to time ty in FIG. 11, the electric power balance control influenced by the communication delay time is performed on purpose. The electric power balance control can thus be performed in safety manner in terms of the overdischarge of DC power supply 510.

Figure 13:
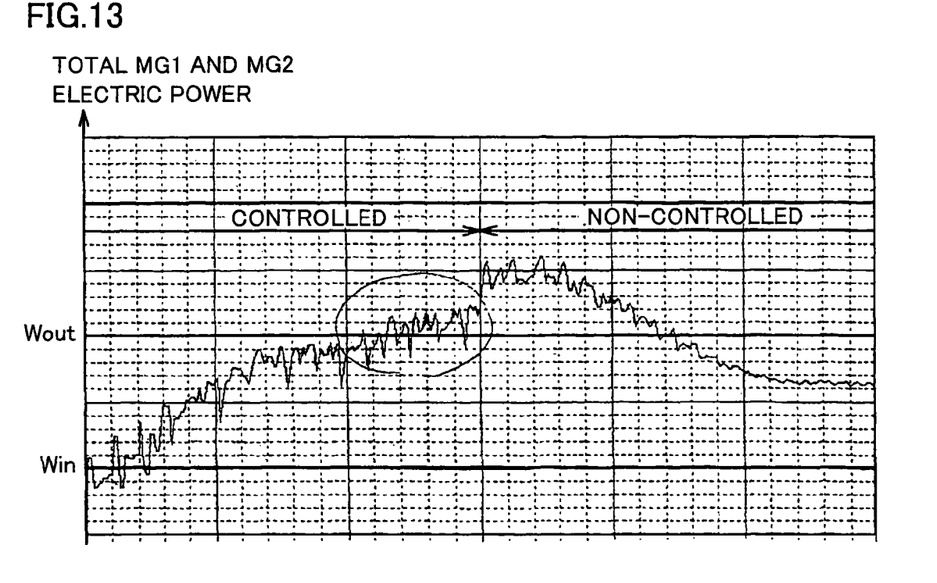
FIG. 13 is a waveform chart showing an experimental result illustrating an effect of the electric power balance control by the control apparatus for a hybrid vehicle according to the embodiment of the present invention.

FIG. 13 shows an experimental result illustrating an effect of the electric power balance control by the control apparatus for a hybrid vehicle in the embodiment of the present invention.

As shown in FIG. 13, in the period in which the electric power balance control is performed according to the embodiment of the present invention, it is understood that the effect of restricting the total electric power of MG1 and MG2 to be equal to or smaller than allowable output electric power Wout is higher than that in the period in which this control is not performed, namely the usual electric power balance control without correcting the communication delay time is performed.

The embodiment and its modification have been illustrated in connection with a control configuration where MG1-ECU 610 calculates MG1 electric power estimate Pm1e for use in the electric power balance control and transmits the estimate to MG2-ECU 620. It is noted for confirmation here that MG1 electric power estimate Pm1e may also be calculated by MG-ECU 620 and, in this case as well, similar effects to those described above can be obtained. In this case, the actual value of MG1 is sequentially transmitted from MG1-ECU 610 to MG2-ECU 620, and the function of electric power estimation unit 650 shown in FIG. 4 is performed by MG2-ECU 620. In other words, the function of electric power estimation unit 650 shown in FIG. 4 may be performed by any of MG1-ECU 610 and MG2-ECU 620.

Further, in connection with the above-described embodiment and its modification, the electric power balance control for a hybrid vehicle mounted with two motor generators MG1, MG2 is explained. In the case where the vehicle is mounted with a larger number of motor generators (electric motors), the electric power balance control can also be achieved using an approach similar to the above-described one to eliminate the influence of the communication delay time between the ECUs controlling the generators and the ECU performing the electric power balance control.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

Industrial Applicability

The present invention is applicable to control of a hybrid vehicle mounted with a plurality of electric motors connected to a common power supply.

The invention claimed is:

1. A control apparatus for a hybrid vehicle mounted with first and second electric motors and a power storage device configured to be able to supply and receive electric power to and from said first and second electric motors, said control apparatus comprising:
   first and second control units for driving and controlling said first and second electric motors respectively;
   a communication path for communicating data between said first and second control units;
   an estimation unit estimating an input/output electric power of said first electric motor at the same timing as an input/output electric power of said second electric motor, based on data about said first electric motor that is obtained by said first control unit and by correcting a communication delay time in said communication path when the data is transmitted from said first control unit to said second control unit; and
   an electric power balance control unit for restricting, by said second control unit, a sum of the input/output electric power of said first electric motor and the input/output electric power of said second electric motor within a predetermined range, using an input/output electric power estimate of said first electric motor that is determined by said estimation unit.

2. The control apparatus for a hybrid vehicle according to claim 1, wherein
   said first control unit drives and controls said first electric motor according to a smoothed torque command value obtained by a smoothing operation of smoothing a torque command value for said first electric motor in a direction of time, and said estimation unit determines said input/output electric power estimate using a torque command value estimate determined by smoothing, in the direction of time, the torque command value for said first electric motor by a time constant smaller than a time constant used in the smoothing operation for obtaining said smoothed torque command value.

3. The control apparatus for a hybrid vehicle according to claim 1, wherein based on a change rate of a rotational speed of said first electric motor, said estimation unit estimates a rotational speed of said first electric motor at a time when said communication delay time has passed, and said estimation unit determines said input/output electric power estimate using the estimated rotational speed of said first electric motor.

4. The control apparatus for a hybrid vehicle according to claim 1, wherein said first control unit sequentially calculates the input/output electric power of said first electric motor from a torque and a rotational speed of said first electric motor, and said estimation unit determines said input/output electric power estimate at a time when said communication delay time has passed, based on said input/output electric power that is sequentially calculated and based on a change rate of said input/output electric power.

5. The control apparatus for a hybrid vehicle according to claim 1, wherein said electric power balance control unit includes a torque restriction unit restricting an output torque of said second electric motor such that a sum of the input/output electric power of said second electric motor that is calculated by said second control unit and said input/output electric power estimate determined by said estimation unit is within said predetermined range.

6. The control apparatus for a hybrid vehicle according to claim 1, wherein said first electric motor is configured to be able to generate electric power as an engine is operated, and said second electric motor is configured to consume electric power and generate a vehicle drive power when operating in power running mode, and to generate an electric power when operating in regenerative braking mode.

7. The control apparatus for a hybrid vehicle according to claim 6, wherein when said electric power balance control unit determines that an operational state of said first electric motor changes in a manner that increases an electric power generated by said first electric motor, said electric power balance control unit restricts the sum of the input/output electric power of said first electric motor and the input/output electric power of said second electric motor within said predetermined range, by using the input/output electric power of said first electric motor recognized as involving said communication delay time, instead of said input/output electric power estimate determined by said estimation unit.

8. The control apparatus for a hybrid vehicle according to claim 7, wherein said electric power balance control unit determines that the operational state of said first electric motor changes in the manner that increases the electric power generated by said first electric motor, when an absolute value of said torque command value changes to increase while said first electric motor generates the electric power.

9. The control apparatus for a hybrid vehicle according to claim 7, wherein said electric power balance control unit determines that the operational state of said first electric motor changes in the manner that increases the electric power generated by said first electric motor, when an absolute value of said rotational speed changes to increase while said first electric motor generates the electric power.

10. The control apparatus for a hybrid vehicle according to claim 7, wherein said first control unit sequentially calculates the input/output electric power of said first electric motor, and said electric power balance control unit determines that the operational state of said first electric motor changes in the manner that increases the electric power generated by said first electric motor, when an absolute value of the calculated input/output electric power changes to increase while said first electric motor generates the electric power.

11. The control method for a hybrid vehicle according to claim 1, wherein said first electric motor is configured to be able to generate electric power as an engine is operated, and said second electric motor is configured to consume electric power and generate a vehicle drive power when operating in power running mode, and to generate an electric power when operating in regenerative braking mode.

12. The control method for a hybrid vehicle according to claim 11, further comprising the steps of:

determining whether or not an operational state of said first electric motor changes in a manner that increases an electric power generated by said first electric motor; and transmitting to said second control unit the input/output electric power of said first electric motor recognized as involving said communication delay time, instead of said input/output electric power estimate determined in said step of estimating, when it is determined that the operational state of said first electric motor changes in the manner that increases the electric power generated by said first electric motor, wherein said step of restricting restricts the sum of the input/output electric power of said first electric motor and the input/output electric power of said second electric motor within said predetermined range, by using the input/output electric power of said first electric motor that is transmitted to said second control unit.

13. The control method for a hybrid vehicle according to claim 12, wherein said step of determining determines that the operational state of said first electric motor changes in the manner that increases the electric power generated by said first electric motor, when an absolute value of said torque command value changes to increase while said first electric motor generates the electric power.

14. The control method for a hybrid vehicle according to claim 12, wherein said step of determining determines that the operational state of said first electric motor changes in the manner that increases the electric power generated by said first electric motor, when an absolute value of said rotational speed changes to increase while said first electric motor generates the electric power.

15. The control method for a hybrid vehicle according to claim 12, wherein
- said first control unit sequentially calculates the input/output electric power of said first electric motor, and
- said step of determining determines that the operational state of said first electric motor changes in the manner that increases the electric power generated by said first electric motor, when an absolute value of the calculated input/output electric power changes to increase while said first electric motor generates the electric power.

16. A control method for a hybrid vehicle mounted with first and second electric motors, a power storage device configured to be able to supply and receive electric power to and from said first and second electric motors, first and second control units for driving and controlling said first and second electric motors respectively, and a communication path for communicating data between said first and second control units, said control method comprising the steps of:
- estimating an input/output electric power of said first electric motor at the same timing as an input/output electric power of said second electric motor, based on data about said first electric motor that is obtained by said first control unit and by correcting a communication delay time in said communication path when the data is transmitted from said first control unit to said second control unit; and
- restricting, by said second control unit, a sum of the input/output electric power of said first electric motor and the input/output electric power of said second electric motor within a predetermined range, using an input/output electric power estimate of said first electric motor that is determined in said step of estimating.

17. The control method for a hybrid vehicle according to claim 16, wherein
- said first control unit drives and controls said first electric motor according to a smoothed torque command value obtained by a smoothing operation of smoothing a torque command value for said first electric motor in a direction of time, and
- said step of estimating determines said input/output electric power estimate using a torque command value estimate determined by smoothing, in the direction of time, the torque command value for said first electric motor by a time constant smaller than a time constant used in the smoothing operation for obtaining said smoothed torque command value.

18. The control method for a hybrid vehicle according to claim 16, wherein
- based on a change rate of a rotational speed of said first electric motor, said step of estimating estimates a rotational speed of said first electric motor at a time when said communication delay time has passed, and said step of estimating determines said input/output electric power estimate using the estimated rotational speed of said first electric motor.

19. The control method for a hybrid vehicle according to claim 16, wherein
- said first control unit sequentially calculates the input/output electric power of said first electric motor from a torque and a rotational speed of said first electric motor, and
- said step of estimating determines said input/output electric power estimate at a time when said communication delay time has passed, based on said input/output electric power that is sequentially calculated and based on a change rate of said input/output electric power.

20. The control method for a hybrid vehicle according to claim 16, wherein
- said step of restricting includes the step of restricting an output torque of said second electric motor such that a sum of the input/output electric power of said second electric motor that is calculated by said second control unit and said input/output electric power estimate determined by said step of estimating is within said predetermined range.

* * * * *